(12) United States Patent
Chand et al.

(10) Patent No.: US 9,268,591 B2
(45) Date of Patent: Feb. 23, 2016

(54) SYSTEMS AND METHODS FOR DETECTING SYSTEM EXCEPTIONS IN GUEST OPERATING SYSTEMS

(71) Applicant: VMware, Inc., Palo Alto, CA (US)

(72) Inventors: Avakash Prem Chand, Mangalore (IN); Laxmisha Nagaraj, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 259 days.

(21) Appl. No.: 13/655,139

(22) Filed: Oct. 18, 2012

(65) Prior Publication Data
US 2014/0115575 A1  Apr. 24, 2014

(51) Int. Cl.
*G06F 11/00* (2006.01)
*G06F 9/455* (2006.01)
*G06F 11/07* (2006.01)

(52) U.S. Cl.
CPC ........ *G06F 9/45558* (2013.01); *G06F 11/0751* (2013.01)

(58) Field of Classification Search
CPC ..................... C06F 11/0751; G06F 9/45558
See application file for complete search history.

(56) References Cited

U.S. PATENT DOCUMENTS

2008/0270825 A1* 10/2008 Goodson et al. .................. 714/6
2011/0205585 A1* 8/2011 Mihara et al. ................ 358/1.15

\* cited by examiner

*Primary Examiner* — Camquy Truong

(57) ABSTRACT

Systems and methods for detecting system exceptions in guest operating systems are provided. A module is provided for each guest operating system and is capable of intercepting system exceptions within the guest operation system. The module communicates with a hypervisor to provide a current status of the guest operating system. In the event of a system exception, the module may collect system exception information, such as a memory dump.

18 Claims, 2 Drawing Sheets

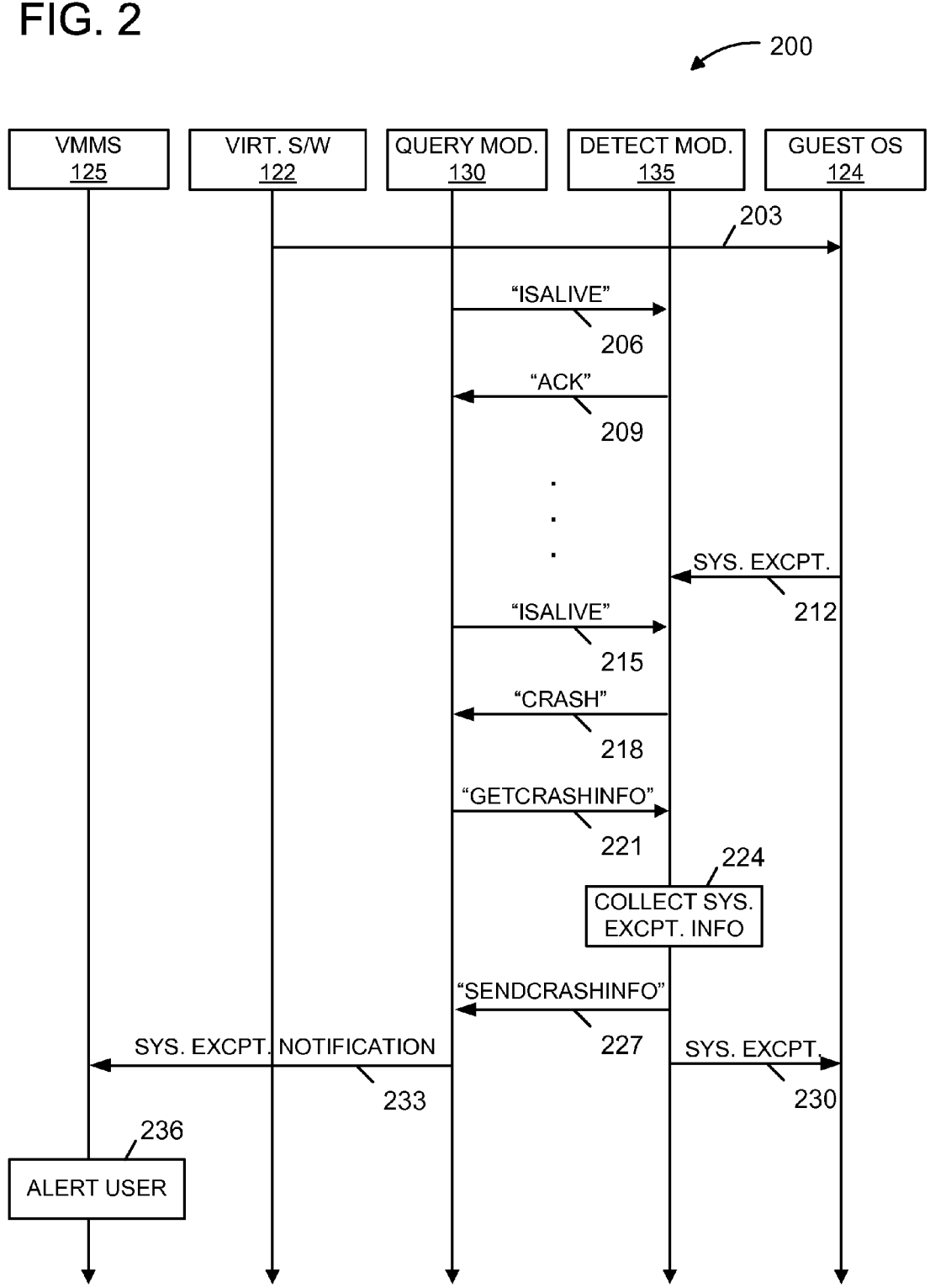

SYSTEMS AND METHODS FOR DETECTING SYSTEM EXCEPTIONS IN GUEST OPERATING SYSTEMS

BACKGROUND

Virtual machines, which are an abstraction of physical computing resources, may include a guest operating system that operates therein. Guest operating systems, like operating systems in non-virtualized environments, are susceptible to system exceptions, or crashes. Datacenters may include thousands, tens of thousands, or more virtual machines that are operating concurrently. Known methods for determining the status of a guest operating system include viewing the console of the virtual machine, analyzing operating system files, and executing user-space software tools within the guest operating system. Using such methods, administrators of large datacenters may be unable to continuously monitor the status of each operating system to ensure that operating systems are operating as expected. Accordingly, there is a need for improved methods and systems for detecting guest operating system crashes and reporting such crashes to administrators.

SUMMARY

Systems and methods for detecting system exceptions in guest operating systems are provided. A module is provided for each guest operating system and is capable of intercepting system exceptions within the guest operating system. The module communicates with a hypervisor to provide a current status of the guest operating system. In the event of a system exception, the module may collect system exception information, such as a memory dump.

BRIEF DESCRIPTION OF THE DRAWINGS

FIG. 2 is a swimlane diagram of an exemplary method for detecting system exceptions in the guest operating systems of FIG. 1.

DETAILED DESCRIPTION

Figure 1:
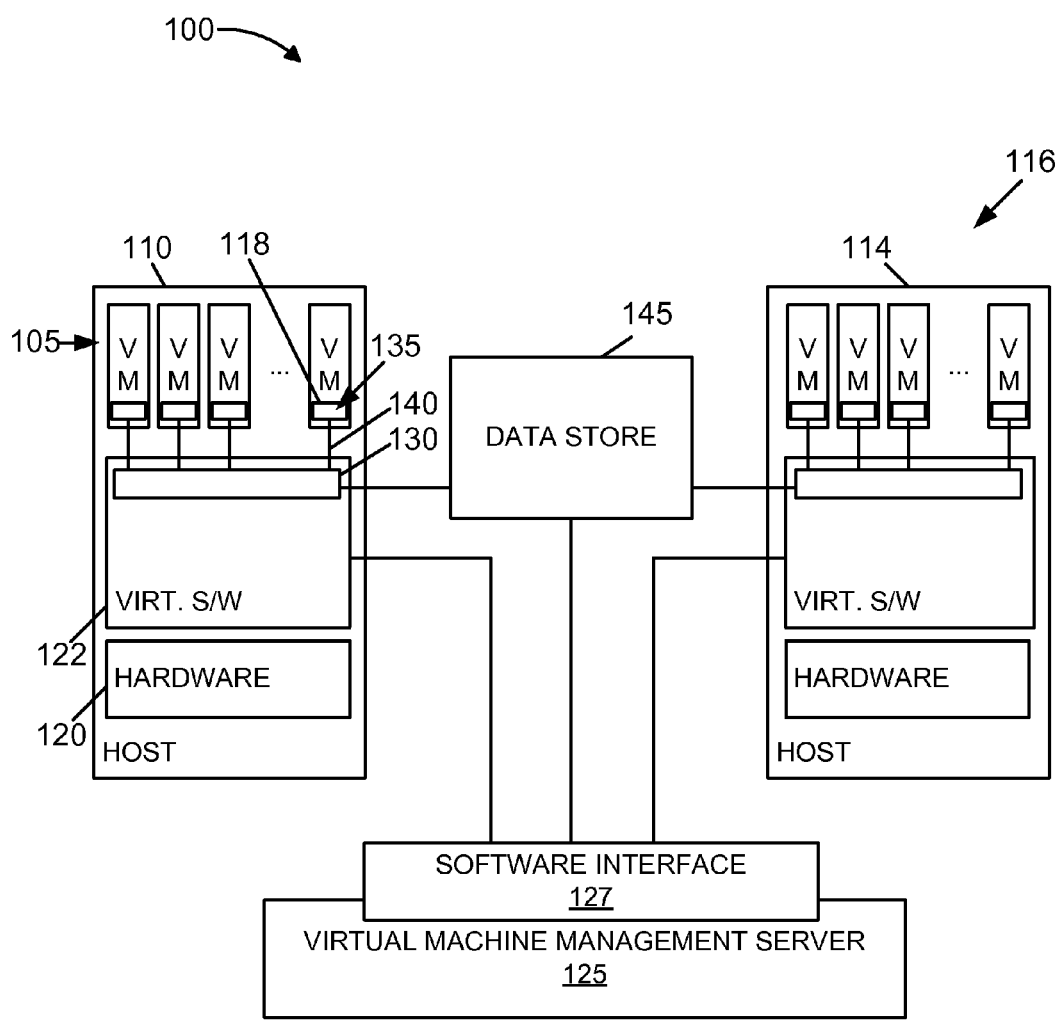
FIG. 1 is an exemplary virtual infrastructure having a plurality of virtual machines and a plurality of guest operating systems.

Embodiments provided herein enable system exceptions to be caught within guest operating systems and reported to virtual infrastructure administrators. As used herein, the phrase "system exception" includes any operating system exception, fault, error, false assertion or other condition which may result in the termination of any or all operating system processes, functionality, and/or interactivity, whether caused by hardware, software, or otherwise. Some examples of system exceptions include kernel panics and the "blue screen of death."

FIG. 1 is an exemplary virtual infrastructure 100 having a plurality of virtual machines (VMs) 105 on physical computer systems, or hosts, 110 and 114, collectively known as a cluster 116. Each VM 105 provides a virtual environment wherein a guest operating system 118 may reside and operate. Each physical computer 110 and 114 includes hardware 120, a virtualization software or manager 122 running on hardware 120, and one or more VMs 105 executing on the hardware 120 by way of virtualization software 122. The virtualization software 122 is therefore logically interposed between, and interfaces with, the hardware 120 and the VMs 105. The virtualization software 122 may be implemented wholly or in part in hardware, e.g., as a system-on-a-chip, firmware, field programmable gate array (FPGA), etc. The hardware 120 includes at least one processor (not shown), wherein each processor is an execution unit, or "core," on a microprocessor chip. The hardware 120 also includes a system memory (not shown), which is a general volatile random access memory (RAM), a network interface port (NIC) (not shown), a storage system (not shown), and other devices.

The virtualization software 122 is sometimes referred to as a hypervisor, and includes software components for managing hardware resources and software components for virtualizing or emulating physical devices to provide virtual devices, such as virtual disks, virtual processors, virtual network interfaces, etc., for each VM 105. In the exemplary embodiment, each VM 105 is an abstraction of a physical computer system and may include an operating system (OS) 118, such as Microsoft Windows® and applications, which are referred to as the "guest OS" 118 and "guest applications," respectively, wherein the term "guest" indicates it is a software entity that resides within the VM. Microsoft Windows® is a registered trademark of the Microsoft Corporation of Redmond, Wash.

A Virtual Machine Management Server (VMMS) 125 provides a software interface 127 that, among other things, allows users and other programs to control the lifecycle of VMs 105 running on physical computers 110 and 114 that are managed by VMMS 125. VMMS 125 may provide other VM management and manipulations than those specifically mentioned here. VMMS 125 may include products such as vCenter and VMware Service Manager, both available from VMware, Inc. of Palo Alto, Calif.

In the exemplary embodiment, the virtualization software 122 includes a query module 130 that may be implemented as a kernel-level module. The query module 130 is configured to communicate with each guest OS 118 associated with the virtualization software 122. More particularly, the query module 130 is configured to communicate with a virtual machine crash detector module 135, or detector module, that may be associated with each guest OS 118. The detector module 135 may be implemented as a kernel-level module.

The query module 130 is configured to determine the status of a guest OS 118 by communicating with the detector module 135 associated with that guest OS 118. The query module 130 generates queries and transmits the queries to the detector module 135. The queries may include a request for guest OS status and a request for crash information, among other things. For example, an "ISALIVE" query may be transmitted by the query module 130 to request a current status of the guest OS 118. In addition, a "GETCRASHINFO" query may be transmitted by the query module 130 to request information available from the guest OS 118 about a system exception.

The query module 130 may transmit guest OS status requests at regular intervals, such as every 5, 10, 15, 30, or 60 seconds, or on demand. The query module 130 may transmit guest OS status requests to all or some of the guest OSes 118 associated with the virtualization software 122. Moreover, the query module 130 may transmit guest OS status requests using round-robin scheduling to two or more guest OSes 118.

Each guest OS status, as collected by the query module 130, may be transmitted to VMMS 125 to provide the status of guest OSes 118 within virtual infrastructure 100. VMMS 125 may be used to cause the query module 130 to initiate a guest OS status request. VMMS 125 may be configured to store and update the current status of guest OSes 118 such that a user of VMMS 125 may determine which guest OSes 118 are not operational due to a system exception. VMMS 125 may be configured to alert the user, e.g., with a displayed message, an audible indicator, an email, etc., when a guest OS 118 has reported a system exception.

The detector module 135 is configured to detect system exceptions. More particularly, the detector module 135 is configured to intercept or otherwise handle system exceptions. For example, the detector module 135 may intercept calls to a system-wide exception handler. In the exemplary embodiment, the detector module 135 is still operable after a system exception has been raised and can respond to queries from the query module 130. Alternatively, if the detector module 135 is unable to respond to queries after a system exception, the query module 130 may interpret unanswered queries as an indication that the guest OS 118 has experienced a system exception. Unanswered queries may include queries that have not received a response in a pre-determined period of time, such as 500 ms.

In response to a guest OS status request, the detector module 135 may respond with an acknowledgement, such as "ACK", to indicate that no system exception has occurred or a system exception indicator message that indicates that a system exception has occurred, such as "CRASH". Upon receiving a system exception indicator message, the query module 130 may request system exception information from the detector module 135. In response to the system exception information request, the detector module 135 may collect system exception information, such as memory dumps, system logs, stack traces, etc. After the system exception information has been collected by the detector module 135, the detector module 135 may respond to the system exception information request with a message, such as "SENDCRASH-INFO", and the collected system exception information.

After the system exception information has been transmitted to the query module 130, the detector module 135 may pass the system exception back to the guest OS for processing. For example, the detector module 135 may invoke a system exception handler for routine processing of the system exception. By intercepting the system exception and not allowing the system exception handler to be invoked, the detector module 135 may be able to operate within the guest OS 118 even after a system exception has caused the guest OS 118 to halt execution of one or more processes.

A communication channel 140 exists between the query module 130 and the detector module 135 to enable communication between the virtualization software 122 and the guest OS 118. The communication channel 140 enables direct communication that may continue even after the guest OS 118 experiences a system exception. The communication channel 140 may be implemented as an application programming interface (API) that provides calls and/or protocols for exchanging information between the virtualization software 122 and the guest OS 118. For example, the communication channel 140 may be implemented using a Virtual Machine Communication Interface (VMCI) or using VMCI Sockets, both available from VMware, Inc. of Palo Alto, Calif. VMCI provides a communications API similar to Berkeley UNIX sockets and Windows sockets for transmitting datagrams and/or sharing memory. UNIX is a registered trademark of The Open Group.

During operation, the query module 130 transmits a guest OS status request message to the detector module 135. The detector module 135 responds with a guest OS status message, which is generally an acknowledgement that indicates that no system exception has occurred in the guest OS 118. The query module 130 continues to transmit guest OS status request messages to the detector module 135 as long as acknowledgements are being returned.

When a system exception occurs, the guest OS 118 generates a system exception, and the detector module 135 intercepts the system exception. The detector module 135 waits until the query module 130 transmits the next guest OS status request message, at which time the detector module 135 transmits a system exception indicator message. Alternatively, or additionally, the detector module 135 may transmit the system exception indicator message to the query module 130 regardless of whether a guest OS status request message has been received. In other words, rather than waiting to be polled, the detector module 135 may push a system exception indicator message to the query module 130.

In response to the system exception indicator message, the query module 130 transmits a system exception information request to the detector module 135. The detector module 135, in response to the system exception information request, causes system exception information to be collected. Once at least partially collected, the detector module 135 transmits a response to the system exception information request. The response may include a message and the collected system exception information.

Within the guest OS 118, the detector module 135 passes the system exception to the system exception handler for routine processing. Once the system exception handler has received the system exception, the guest OS 118 may halt one or more processes and may become unresponsive. Within the virtualization software 122, the query module 130 transmits a message to VMMS 125 indicating that a system exception has been detected. The system exception information may also be transmitted to VMMS 125. Alternatively, the query module 130 may store the system exception information in a data store 145 that is accessible to VMMS 125 and transmit the location of the system exception information with the system exception notification message. The data store 145 may be a network attached storage device, a network resource shared by the virtualization software 122, a virtual storage device in a guest OS, a database, etc.

VMMS 125 alerts a user of the system exception and the availability of system exception information, if applicable. The user may then use VMMS 125 to restart the VM 105 associated with the guest OS 118 that experienced a system exception. Thus, in automated fashion, the virtual infrastructure 100 is capable of detecting and reporting system exceptions, or crashes, within guest OSes 118.

FIG. 2 is a swimlane diagram of an exemplary method 200 for detecting system exceptions in the guest OSes 118 in the virtual infrastructure 100 shown in FIG. 1. In the exemplary embodiment, in operation 203, the virtualization software 122 may provide the detector module 135 to the guest OS 118. For example, the detector module 135 may be provided to the guest OS 118 as a kernel module that may be inserted into a running kernel in the guest OS 118. Accordingly, the virtualization software 122 may provide a detector module that is compatible with the guest OS 118. In some embodiments, the detector module 135 may be provided as part of a collection of software, drivers, modules, and other tools for providing additional functionality to the guest OS 118 within a virtual environment, such as virtual machine 105 (shown in FIG. 1).

In operation 206, the query module 130 transmits a guest OS status request message to the detector module 135. The guest OS status request message, and other messages and data, may be transmitted to and from the detector module 135 using the communication channel 140 (shown in FIG. 1). In operation 209, the detector module 135 responds to the query module 130 with an acknowledgement that indicates that no system exception has occurred in the guest OS 118. Operation 206 and operation 209 may be repeated together any number of times until a system exception occurs in the guest OS 118.

In operation 212, the guest OS 118 experiences a system exception and raises the system exception, which is intercepted by the detector module 135. The detector module 135 receives, or catches, the system exception from the guest OS 118. In operation 215, which is similar to operation 206, the query module 130 transmits a guest OS status request message to the detector module 135. The detector module 135, in operation 218, responds with a system exception indicator message that indicates that the guest OS 118 has experienced a system exception.

In response to receiving the system exception indicator message, the query module 130 may, in operation 221, transmit a system exception information request message. In operation 224, the detector module 135 may collect system exception information, which may include memory dumps, system logs, stack traces, etc., from the guest OS 118 and/or the VM environment. In operation 227, the detector module 135 transmits a system exception information message and the collected system exception information.

After transmitting the system exception information, the detector module 135 may, in operation 230, pass the system exception back to the guest OS 118 for routine processing. For example, the detector module 135 may invoke, within the guest OS 118, a system exception handler that would have received the system exception if the detector module 135 had not intercepted the system exception. The query module 130, having received the system exception indicator message and/or the system exception information, may, in operation 233, directly or through operation of the virtualization software 122, transmit a system exception notification message to VMMS 125. The query module 130 may store the collected system exception information in the data store 145 (shown in FIG. 1). The system exception notification message may include details about the system exception, including the name of the associated VM, the guest OS type, the contents of the system exception information, the location of the system exception information (in the case where the query module 130 stored the system exception information in the data store 145), and other details relating to the system exception and/or the guest OS 118.

In response to receiving the system exception notification message, VMMS 125 may alert a user of VMMS 125 in operation 236. The alert may be displayed as a message within a console or other user interface of VMMS 125, such as software interface 127. The alert may indicate which guest OS 118 generated the system exception, the presence or absence of system exception information, the host associated with the guest OS 118, and/or the type of guest OS. The alert may also indicate a virtual machine name associated with the guest OS 118, and/or other information about the guest OS 118 available from VMMS 125.

Exemplary Operating Environment

The detection and reporting of system exceptions as described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for detecting system exceptions.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A virtual machine host comprising:
   a virtual machine that includes a guest operating system (OS);
   a detector module capable of detecting a system exception in the guest OS, the system exception being a crash of the guest OS, and wherein the detector module executes within the guest OS and is capable of executing within the guest OS after the system exception has occurred; and
   a hypervisor comprising a query module, the query module configured to determine a current status of the guest OS by receiving a guest OS status message from the detector module, wherein the guest OS status message includes a system exception indicator, the query module further configured to transmit a system exception information request message to the detector module after receiving the guest OS status message that includes the system exception indicator, and in response to the system exception information request message, receive, from the detector module, system exception information collected by the detector module.

2. The virtual machine host of claim 1, wherein the query module is further configured to transmit a guest OS status request message to the detector module and the detector module is configured to transmit the guest OS status message in response to the guest OS status request message.

3. The virtual machine host of claim 1, wherein the detector module is a kernel module inserted into a kernel of the guest OS.

4. The virtual machine host of claim 3, wherein the detector module is configured to intercept the system exception such that the detector module continues executing after the system exception occurs.

5. The virtual machine host of claim 4, wherein the detector module is further configured to:
   collect the system exception information in response to receiving the system exception information request message; and
   transmit the collected system exception information to the query module.

6. The virtual machine host of claim 5, wherein the query module is further configured to transmit a system exception notification message to a virtual machine management server when the query module receives the collected system exception information from the detector module.

7. The virtual machine host of claim 1, further comprising a communication channel that enables communication between the query module and the detector module.

8. The virtual machine host of claim 1, wherein after the system exception information has been transmitted to the query module, invoking, by the detector module, a system exception handler for routine processing of the system exception.

9. A computer-implemented method for detecting system exceptions in a guest operating system (OS) of a virtual machine executing on a host, the method comprising:
   a virtual machine that includes a guest operating system (OS);
   detecting a system exception in the guest OS, the system exception being a crash of the guest OS, and wherein the detector module executes within the guest OS and is capable of executing within the guest OS after the system exception has occurred; and
   receiving, by a detector module executing within the guest OS, a guest OS status request message;
   transmitting, by the detector module to a query module executing within a hypervisor of the host, a guest OS status message that indicates whether a system exception has occurred in the guest OS, the system exception being a crash of the guest OS;
   intercepting, by the detector module, the system exception from the guest OS; receiving, by the detector module, a request from the query module for system exception information; and
   collecting and transmitting, by the detector module, system exception information in response to the request for system exception information.

10. The computer-implemented method of claim 9, further comprising invoking a system exception handler in the guest OS after the system exception information is transmitted.

11. The computer-implemented method of claim 9, wherein collecting and transmitting system exception information comprises collecting a memory dump, a system log, or a stack trace.

12. The computer-implemented method of claim 9, wherein transmitting a guest OS status message comprises transmitting an acknowledgement or a system exception indicator.

13. A non-transitory computer-readable storage medium comprising computer-executable components for detecting system exceptions in a guest operating system (OS) of a virtual machine executing on a host, the components comprising:
   a detector module executing within the guest OS of a virtual machine, the detector module when executed by at least one processor causes the at least one processor to detect a system exception in the guest OS, the system exception being a crash of the guest OS, and wherein the detector module is capable of executing within the guest OS after a system exception has occurred; and
   a query module executed within a hypervisor of the host, the query module when executed by the at least one processor causes the at least one processor to determine a current status of the guest OS by receiving a guest OS status message from the detector module, wherein the guest OS status message includes an acknowledgement or a system exception indicator, the query module configured to transmit a system exception information request message to the detector module after receiving the guest OS status message that includes the system exception indicator, and in response to the system exception information request message, receive, from the detector module, system exception information collected by the detector module.

14. A non-transitory computer-readable storage medium of claim 13, wherein the query module further causes the at least one processor to transmit a guest OS status request message to the detector module; and
   wherein the detector module further causes the at least one processor to transmit the guest OS status message in response to the guest OS status request message.

15. A non-transitory computer-readable storage medium of claim 13, wherein the detector module is a kernel module inserted into a kernel of the guest OS.

16. A non-transitory computer-readable storage medium of claim 15, wherein the detector module further causes the at least one processor to intercept the system exception such that the detector module continues executing after the system exception occurs.

17. A non-transitory computer-readable storage medium of claim 16, wherein the detector module further causes the at least one processor to:
- collect the system exception information in response to receiving the system exception information request message; and
- transmit the collected system exception information to the query module.

18. A non-transitory computer-readable storage medium of claim 17, wherein the query module further causes the at least one processor to transmit a system exception notification message to a virtual machine management server when the query module receives the collected system exception information from the detector module.

* * * * *